(12) United States Patent
Koga

(10) Patent No.: US 10,346,940 B2
(45) Date of Patent: Jul. 9, 2019

(54) ROBOT SYSTEM AND PRODUCTION SYSTEM

(71) Applicant: FANUC CORPORATION, Yamanashi (JP)

(72) Inventor: Kentaro Koga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/843,861

(22) Filed: Dec. 15, 2017

(65) Prior Publication Data
US 2018/0174266 A1 Jun. 21, 2018

(30) Foreign Application Priority Data
Dec. 21, 2016 (JP) ................. 2016-248015

(51) Int. Cl.
| | | |
|---|---|---|
| G06F 7/00 | (2006.01) | |
| G06T 1/00 | (2006.01) | |
| B25J 9/16 | (2006.01) | |
| B65G 43/08 | (2006.01) | |

(Continued)

(52) U.S. Cl.
CPC ............ G06T 1/0014 (2013.01); B25J 9/1679 (2013.01); B25J 9/1697 (2013.01); B65G 43/08 (2013.01); B65G 47/71 (2013.01); G05B 19/4182 (2013.01); G05B 19/41815 (2013.01); G05B 2219/39102 (2013.01); G05B 2219/39106 (2013.01); G05B 2219/39394 (2013.01); Y02P 90/08 (2015.11); Y02P 90/083 (2015.11)

(58) Field of Classification Search
None
See application file for complete search history.

(56) References Cited

U.S. PATENT DOCUMENTS

| | | |
|---|---|---|
| 2007/0007924 A1 | 1/2007 | Nishihara et al. |
| 2008/0301072 A1 | 12/2008 | Nagatsuka et al. |
| 2010/0094453 A1 | 4/2010 | Nishihara et al. |

(Continued)

FOREIGN PATENT DOCUMENTS

| | | |
|---|---|---|
| EP | 2033747 A2 | 3/2009 |
| EP | 2998077 A2 | 3/2016 |

(Continued)

OTHER PUBLICATIONS

Japanese Office Action dated Aug. 7, 2018, for Japanese Patent Application No. 2016-248015.

(Continued)

*Primary Examiner* — Yolanda R Cumbess
(74) *Attorney, Agent, or Firm* — Karceski IP Law, PLLC (57) ABSTRACT

A robot system includes an image pickup apparatus that picks up images of a plurality of kinds of articles conveyed by a conveyor; an article controlling portion that controls time and a position of each of the plurality of kinds of articles being supplied onto the conveyor, to limit kinds of articles to be image-picked-up by the image pickup apparatus in advance; a detecting portion that detects the plurality of kinds of articles from among images picked up by the image pickup apparatus, on the basis of the kinds of articles limited in advance by the article controlling portion; and a robot that is configured to take out the plurality of kinds of articles detected by the detecting portion from the conveyor.

9 Claims, 6 Drawing Sheets

(51) Int. Cl.
*B65G 47/71* (2006.01)
*G05B 19/418* (2006.01)

(56) References Cited

U.S. PATENT DOCUMENTS

| | | | | |
|---|---|---|---|---|
| 2014/0135969 | A1* | 5/2014 | Groth | G05B 19/41865 700/112 |
| 2016/0083198 | A1 | 3/2016 | Nishizaka et al. | |
| 2016/0096298 | A1* | 4/2016 | Uchiyama | B29C 45/1769 425/163 |
| 2016/0159510 | A1* | 6/2016 | Lau | B65B 35/10 53/453 |
| 2016/0199884 | A1* | 7/2016 | Lykkegaard | B07C 5/02 700/223 |
| 2016/0221762 | A1* | 8/2016 | Schroader | B65G 43/08 |

FOREIGN PATENT DOCUMENTS

| | | |
|---|---|---|
| GB | 2428035 A | 1/2007 |
| JP | S4856257 A | 8/1973 |
| JP | H03262620 | 11/1991 |
| JP | 05081415 A | 4/1993 |
| JP | 2001282339 A | 10/2001 |
| JP | 2003211096 A | 7/2003 |
| JP | 2007015055 | 1/2007 |
| JP | 2008296330 A | 12/2008 |
| JP | 2016060004 | 4/2016 |

OTHER PUBLICATIONS

Japanese Search Report by Registered Searching Authority dated Aug. 7, 2018, for Japanese Patent Application No. 2016-248015.

* cited by examiner

ROBOT SYSTEM AND PRODUCTION SYSTEM

CROSS-REFERENCE TO RELATED APPLICATIONS

This application is based on and claims priority to Japanese Patent Application No. 2016-248015, filed on Dec. 21, 2016, the entire content of which is incorporated herein by reference.

FIELD OF THE INVENTION

The present invention relates to a robot system and a production system that are suitable for transferring a plurality of kinds of articles that are conveyed.

BACKGROUND OF THE INVENTION

Conventionally, a handling apparatus has been known which detects an article (a work) conveyed by a conveyor by a visual sensor and transfers the detected article by a robot.

Japanese Unexamined Patent Application, Publication No. 2007-15055, discloses a handling apparatus capable of efficiently processing information about a plurality of articles that are conveyed, by dividing a conveyor in a conveyance direction and managing data for each divided range.

SUMMARY OF THE INVENTION

A first aspect of the present invention is a robot system including: an image pickup apparatus that picks up images of a plurality of kinds of articles conveyed by a conveyor; an article controlling portion that controls time and a position of each of the plurality of kinds of articles being supplied onto the conveyor to limit kinds of articles to be image-picked-up by the image pickup apparatus in advance; a detecting portion that detects the plurality of kinds of articles from the images picked up by the image pickup apparatus, on the basis of the kinds of articles limited in advance by the article controlling portion; and a robot that is configured to take out the plurality of kinds of articles detected by the detecting portion from the conveyor.

A second aspect of the present invention is a production system including: a conveyor that conveys a plurality of kinds of articles; a plurality of production apparatuses that supply the plurality of kinds of articles to the conveyor; an image pickup apparatus that picks up images of the plurality of kinds of articles conveyed by the conveyor; an article controlling portion that controls time and a position of each of the plurality of kinds of articles being supplied onto the conveyor, to limit kinds of articles to be image-picked-up by the image pickup apparatus in advance; a detecting portion that detects the plurality of kinds of articles from the images picked up by the image pickup apparatus, on the basis of the kinds of articles limited in advance by the article controlling portion; and a robot that is configured to take out the plurality of kinds of articles detected by the detecting portion from the conveyor.

DESCRIPTION OF EMBODIMENT(S) OF THE INVENTION

A robot system and a production system according to an embodiment of the present invention will be described below with reference to drawings.

Figure 1:
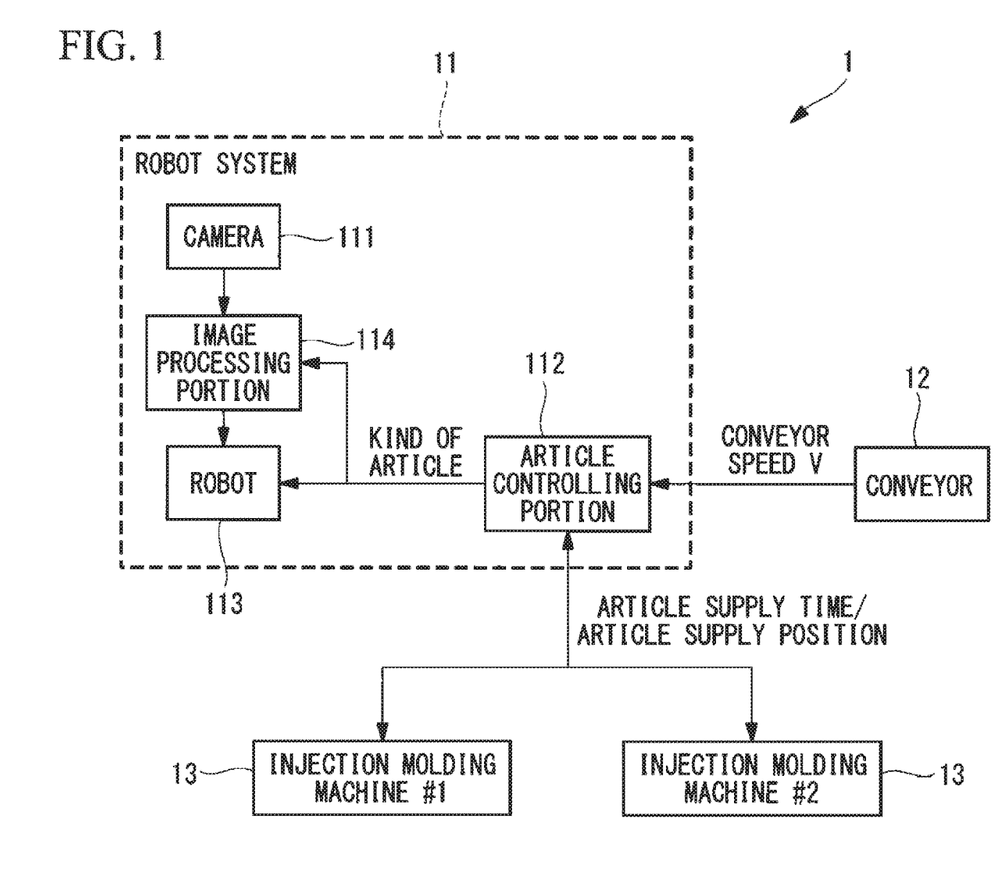
FIG. 1 is a block diagram showing a schematic configuration of a production system provided with a robot system according to an embodiment of the present invention.

As shown in FIG. 1, a production system 1 is provided with a robot system 11, a conveyor 12, and two injection molding machines 13 that are referred to as an injection molding machine #1 and an injection molding machine #2. The conveyor 12 and the injection molding machines 13 are connected to the robot system 11.

The injection molding machine #1 and the injection molding machine #2 are configured to product two different kinds of articles, respectively, and supply the articles onto the conveyor 12, in response to an instruction from the robot system 11. In the present embodiment, it is assumed that the injection molding machine #1 produces articles A, and the injection molding machine #2 produces articles B. The injection molding machine #1 is arranged on a downstream side of the injection molding machine #2 in a traveling direction of the conveyor 12 (see FIG. 2).

The conveyor 12 is configured to convey the two kinds of articles supplied from the injection molding machines 13. Further, the conveyor 12 is provided with a conveyor sensor 14 that detects movement speed of the conveyor 12 (see FIG. 2) and is configured to output conveyance operation information such as conveyor speed V to the robot system 11.

In the production system 1, the two kinds of articles produced by the injection molding machine #1 and the injection molding machine #2, respectively, that is, the articles A and the articles B are sequentially discharged onto the conveyor 12, and the articles A and the articles B conveyed by the conveyor 12 are transferred to a different place, for example, onto a fixed station 15 (see FIG. 2) by the robot system 11.

The robot system 11 is provided with a camera (an image pickup apparatus) 111, an article controlling portion 112, a robot 113 and an image processing portion (a detecting portion) 114. The robot 113 is connected to the article controlling portion 112 and the image processing portion 114. The image processing portion 114 is connected to the camera 111 and the article controlling portion 112. The article controlling portion 112 is connected to the conveyor 12 and the injection molding machines 13.

Figure 2:
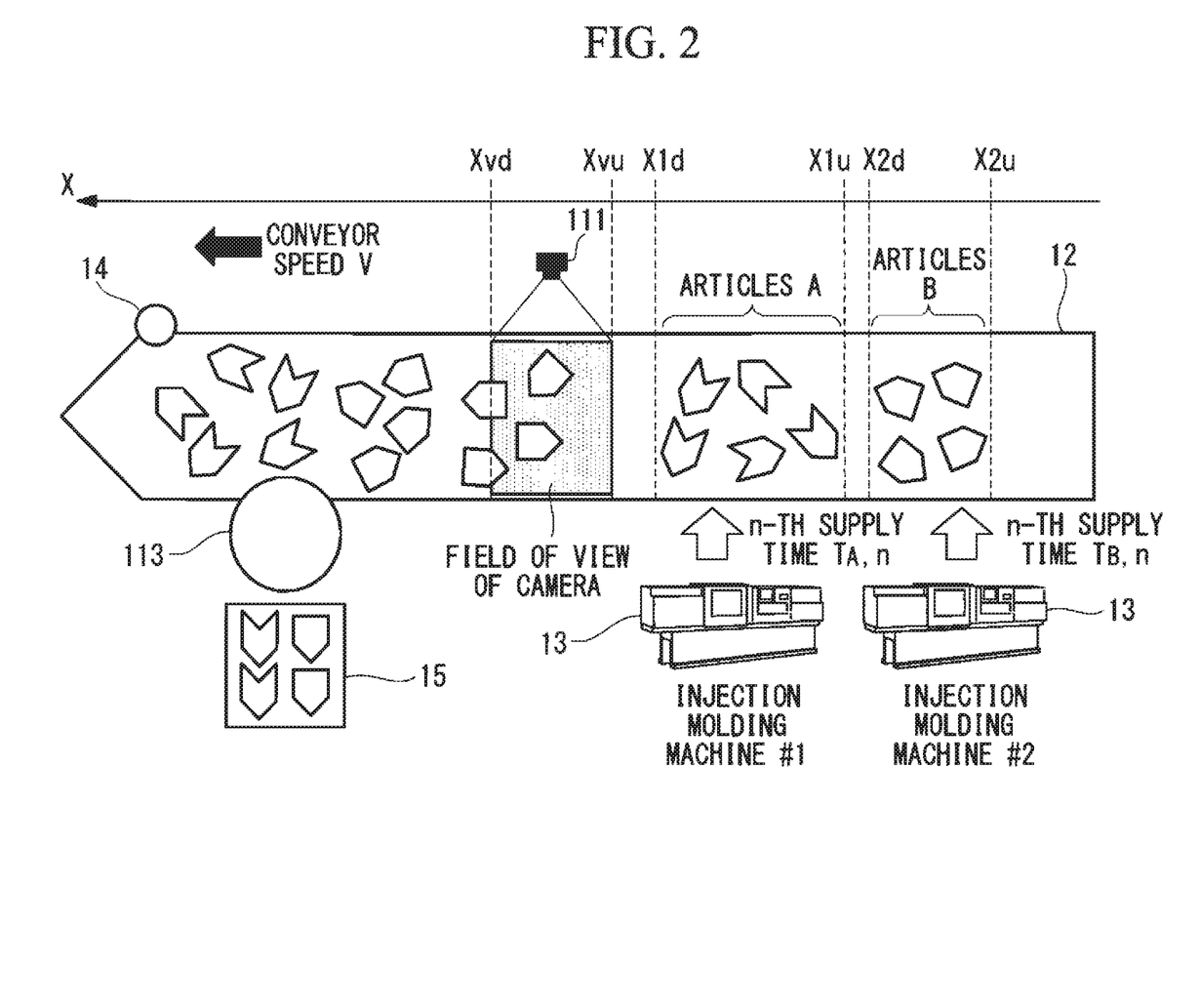
FIG. 2 is a schematic diagram illustrating an example of a case where two kinds of articles are conveyed in the production system shown in FIG. 1.

As shown in FIG. 2, the camera 111 is arranged between the injection molding machines 13 arranged on an upstream side and the robot 113 arranged on a downstream side in the traveling direction of the conveyor 12 and is configured to photograph the articles A and articles B conveyed by the conveyor 12 from above the conveyor 12.

The article controlling portion 112 is provided with a processor, main memories such as a ROM (Read Only Memory) and a RAM (Random Access Memory), an auxiliary storage device such as an HDD (Hard Disk Drive), and an external interface for exchanging various data with external apparatuses, which are connected to one another via a bus though they are not shown. A program that realizes functions described below is stored in the auxiliary storage device. By the processor reading out the program from the auxiliary storage device into the main memory, the program is executed.

As shown in FIG. 1, the article controlling portion 112 is configured to, by controlling positions and times of the injection molding machines 13 supplying the articles onto the conveyor 12 on the basis of the conveyor speed V received from the conveyor 12, limit a kind of article to be photographed by the camera 111 in advance and transmit information about the kind of article to the robot 113 and the image processing portion 114.

More specifically, the article controlling portion 112 is configured to control the injection molding machine #1 and the injection molding machine #2 so that conditions described below may be satisfied.

First, an X axis is taken in the traveling direction of the conveyor 12 as shown in FIG. 2. That is, the X axis is set so that the value of X increases in a direction from upstream to downstream of the conveyor 12.

Further, an area on the conveyor 12 in which the articles A produced by the injection molding machine #1 are supplied is indicated as $X_{1u}$ to $X_{1d}$, and an area on the conveyor 12 in which the articles B produced by the injection molding machine #2 are supplied is indicated as $X_{2u}$ to $X_{2d}$. These areas are defined, for example, by the size and position of a discharge opening of a supply apparatus such as a shooter that is provided on each of the injection molding machine #1 and the injection molding machine #2 to supply the articles A and the articles B onto the conveyor 12. The size and position of the discharge opening can be changed, for example, by an opening/closing plate or the like provided on an opening portion of the discharge opening being controlled by the article controlling portion 112.

Further, a range of a field of view photographed by the camera 111 is indicated as $X_{vu}$ to $X_{vd}$.

Further, time at which the articles A are supplied onto the conveyor 12 at the n-th time is indicated as $T_{A,n}$, time at which the articles B are supplied onto the conveyor 12 at the n-th time is indicated as $T_{B,n}$. It is assumed that the conveyor speed V is a constant speed.

The "time" may be system time expressing elapsed time common to the whole production system 1 or may be time expressing relative elapsed time between the injection molding machine #1 and the injection molding machine #2.

The article controlling portion 112 is configured to control positions and times of the articles A and articles B being supplied so that the following formulas (1) and (2) are satisfied as conditions.

$$X_{1u}+V(T_{B,n}-T_{A,n})>X_{2d} \tag{1}$$

$$X_{2u}+V(T_{A,n+1}-T_{B,n})>X_{1d} \tag{2}$$

Figure 3:
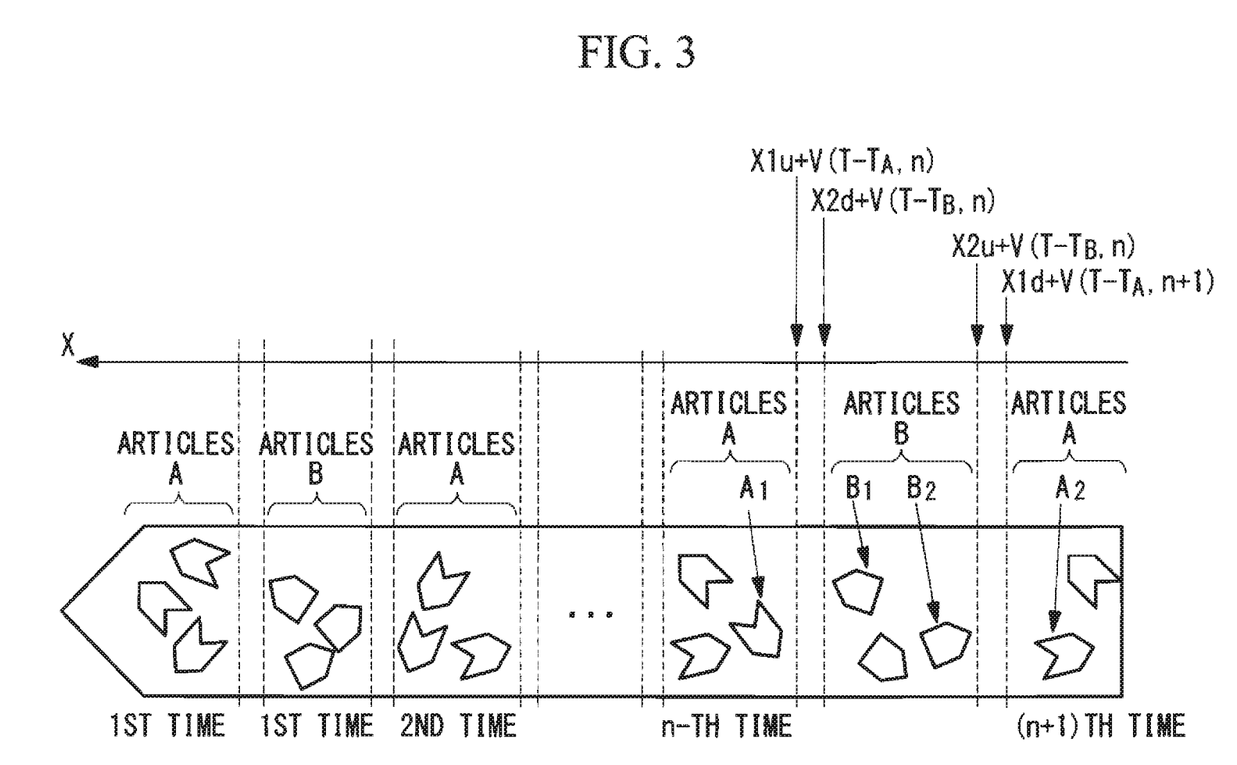
FIG. 3 is a diagram illustrating an arrangement state of the articles at arbitrary time in the example shown in FIG. 2.

Here, the formula (1) means that what is the most downstream among articles B supplied at the n-th time ($B_1$ in FIG. 3) is more downstream than what is the most upstream among articles A supplied at the n-th time ($A_1$ in FIG. 3). For this, it is sufficient if the following formula (1') is satisfied at arbitrary time T.

$$X_{1u}+V(T-T_{A,n})>X_{2d}+V(T-T_{B,n}) \tag{1'}$$

By transforming the formula (1'), the formula (1) is derived.

Similarly, the formula (2) means that what is the most downstream among articles A supplied at the (n+1)th time ($A_2$ in FIG. 3) is more upstream than what is the most upstream among the articles B supplied at the n-th time ($B_2$ in FIG. 3). For this, it is sufficient if the following formula (2') is satisfied at arbitrary time T.

$$X_{2u}+V(T-T_{B,n})>X_{1d}+V(T-T_{A,n+1}) \tag{2'}$$

By transforming the formula (2'), the formula (2) is derived.

Therefore, by the article controlling portion 112 performing control so that the formula (1) and the formula (2) are satisfied, it is secured that all the articles A supplied at the n-th time are downstream of all the articles B supplied at the n-th time, and that all the articles B supplied at the n-th time is downstream of all the articles A supplied at the (n+1)th time.

Thus, since the different kinds of articles A and articles B are conveyed in a manner that the articles are not mixed, it is possible to simplify and efficiently perform detection of an article at a subsequent stage by the image processing portion 114.

Similarly to the article controlling portion 112, the image processing portion 114 is provided with a processor, main memories such as a ROM (Read Only Memory) and a RAM (Random Access Memory), an auxiliary storage device such as an HDD (Hard Disk Drive), and an external interface for exchanging various data with external apparatuses, which are connected to one another via a bus though they are not shown. A program that realizes functions described below is stored in the auxiliary storage device. By the processor reading out the program from the auxiliary storage device into the main memory, the program is executed.

The image processing portion 114 is configured to perform pattern matching on the basis of images of articles picked up by the camera 111 and a kind of article received from the article controlling portion 112, to detect an article.

The image processing portion 114 is configured to perform pattern matching only for a model (a template) of the articles B at time T that satisfies the following formulas (3) and (4).

$$X_{1u}+V(T-T_{A,n})>X_{vd} \tag{3}$$

$$X_{1d}+V(T-T_{A,n+1})<X_{vu} \tag{4}$$

Figure 4:
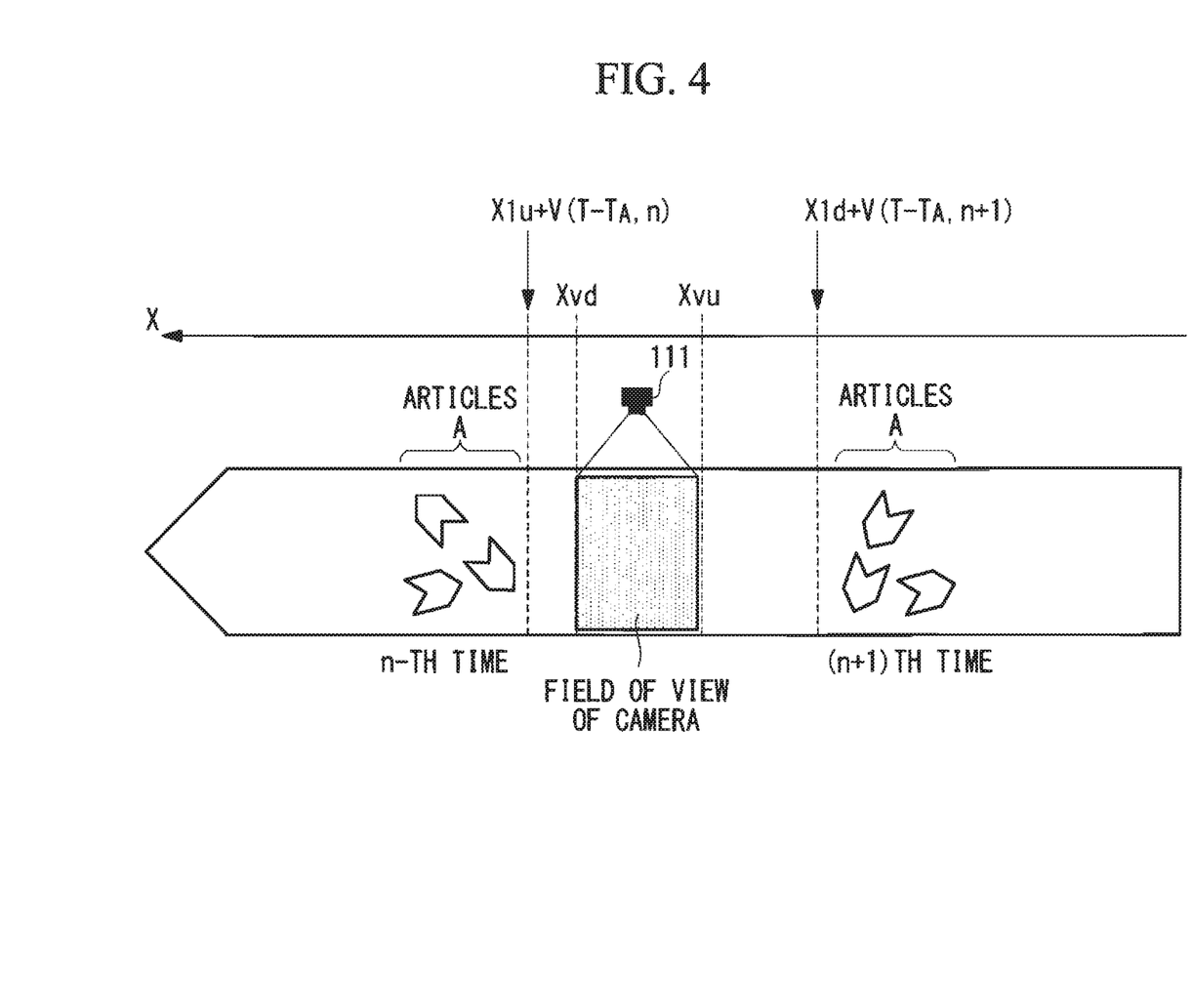
FIG. 4 is a diagram illustrating a positional relationship in which one kind of article is not included in a field of view of a camera in the example shown in FIG. 2.

Here, as shown in FIG. 4, the formula (3) means that what is the most upstream among the articles A supplied at the n-th time is downstream of the field of view of the camera 111. Further, the formula (4) means that what is the most downstream among the articles A supplied at the (n+1)th time is upstream of the field of view of the camera 111. That is, at the time T that satisfies the formulas (3) and (4), the articles A do not exist within the field of view of the camera 111, and only one kind of articles B exists.

Therefore, it is necessary to perform pattern matching only for the model (the template) of the articles B, so that it is possible to shorten processing time taken for pattern matching, and it is possible to efficiently perform detection of articles.

Further, the image processing portion 114 is configured to perform pattern matching only for a model (a template) of the articles A at time T that satisfies the following formulas (5) and (6).

$$X_{2u}+V(T-T_{B,n})>X_{vd} \quad (5)$$

$$X_{2d}+V(T-T_{B,n+1})<X_{vu} \quad (6)$$

Figure 5:
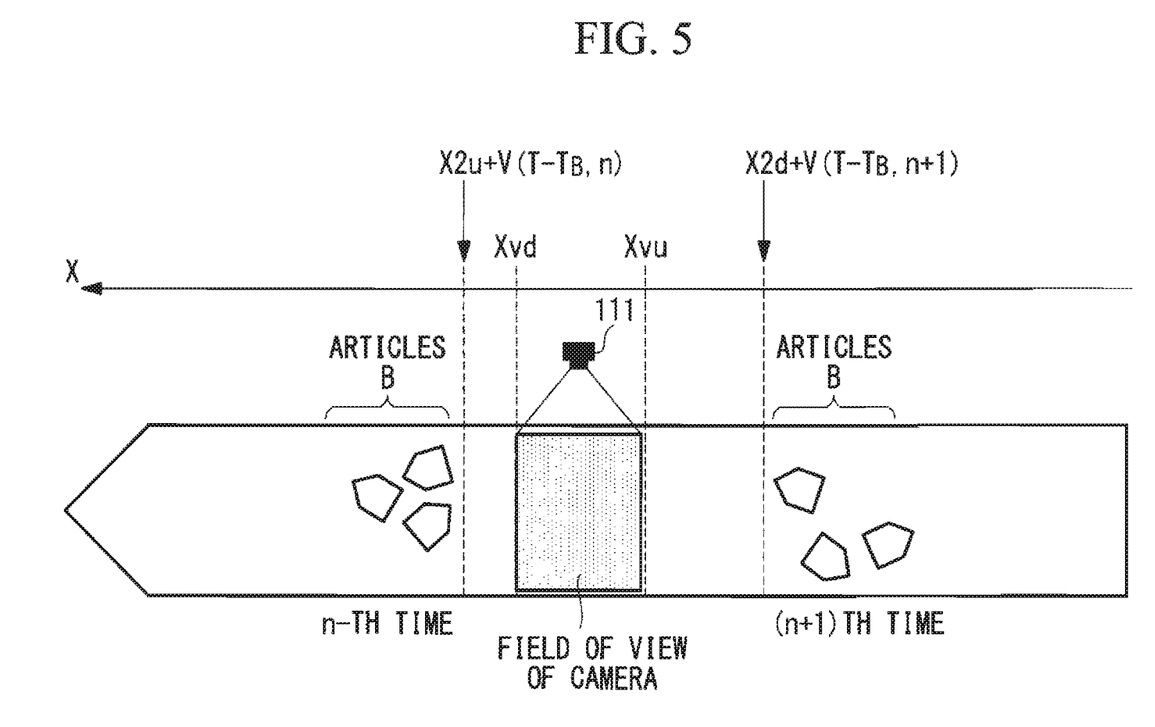
FIG. 5 is a diagram illustrating a positional relationship in which the other kind of article is not included in the field of view of the camera in the example shown in FIG. 2.

Here, as shown in FIG. 5, the formula (5) means that what is the most upstream among the articles B supplied at the n-th time is downstream of the field of view of the camera 111. Further, the formula (6) means that what is the most downstream among articles B supplied at the (n+1)th time is upstream of the field of view of the camera 111. That is, at the time T that satisfies the formulas (5) and (6), the articles B do not exist within the field of view of the camera 111, and only one kind of articles A exists.

Therefore, it is necessary to perform pattern matching only for the model (the template) of the articles A, so that it is possible to shorten processing time taken for pattern matching, and it is possible to efficiently perform detection of articles.

The image processing portion 114 described above is implemented with an image processing function including pattern matching by the processor executing a program, which is software. However, the present invention is not limited thereto, but the image processing function may be implemented as hardware such as a circuit on a silicon chip.

The robot 113 is provided with a robot control device and a robot arm that are not shown and is configured so that the robot control device receives a kind of article received from the article controlling portion 112, and, on the basis of the kind, the robot arm takes out a detected article from the conveyor 12 and transfers the article onto the fixed station 15 (see FIG. 2) that holds the articles A and the articles B in a state of being arranged in line.

Figure 6:
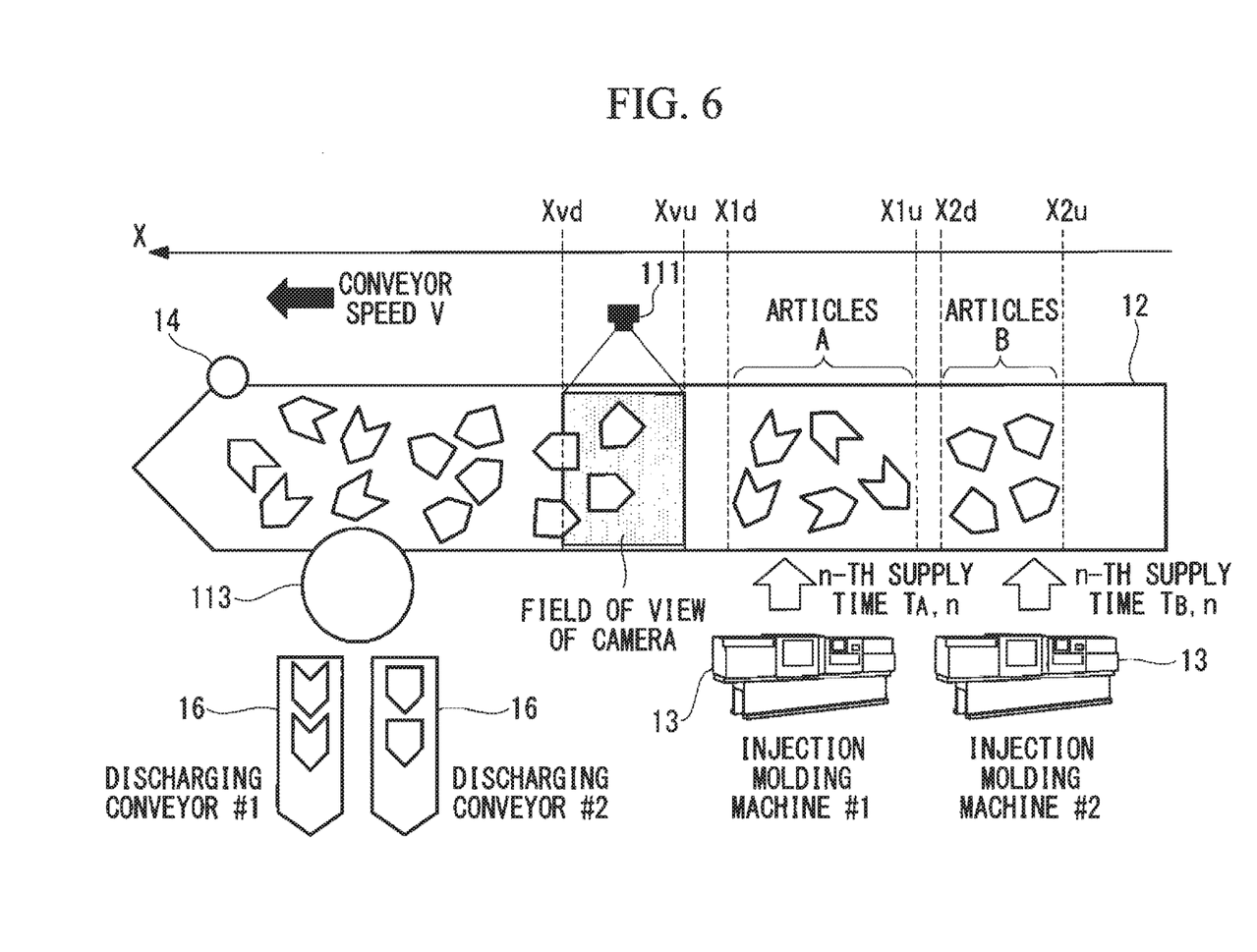
FIG. 6 is a diagram showing a modification of the example shown in FIG. 2.

As shown in FIG. 6, the production system 1 may be provided with a plurality of dispensing devices 16 referred to as a discharging conveyor #1 for conveying only the articles A and a conveying conveyor #2 for conveying only the articles B instead of the fixed station 15.

The embodiment of the present invention has been described above in detail with reference to the drawings. A specific configuration, however, is not limited to the embodiment, but design changes and the like within a range not departing from the scope of the present invention are also included.

For example, although it is assumed in the present embodiment that the production system 1 is provided with the two injection molding machines 13 referred to as the injection molding machine #1 and the injection molding machine #2 as production apparatuses, and the two injection molding machines 13 produce the articles A and the articles B, respectively, for simplification, the present invention is not limited thereto. The production system 1 may be provided with three or more injection molding machines 13 and configured to produce three or more kinds of articles. Further, in this case, the number of dispensing devices 16 may be, of course, changed according to the kinds of produced articles.

Further, although it is assumed in the above embodiment that the injection molding machine #1 and the injection molding machine #2 alternately supply the articles A and the articles B onto the conveyor 12, the present invention is not limited thereto. The articles A and the articles B may not be alternately supplied.

Further, although description has been made in the above embodiment with an injection molding machine as an example of a production apparatus, the present invention is not limited thereto. Any apparatus capable of producing articles is possible as the production apparatus.

As a result, the above-described embodiment leads to the following aspects.

A first aspect of the present invention is a robot system including: an image pickup apparatus that picks up images of a plurality of kinds of articles conveyed by a conveyor; an article controlling portion that controls time and a position of each of the plurality of kinds of articles being supplied onto the conveyor to limit kinds of articles to be image-picked-up by the image pickup apparatus in advance; a detecting portion that detects the plurality of kinds of articles from the images picked up by the image pickup apparatus, on the basis of the kinds of articles limited in advance by the article controlling portion; and a robot that is configured to take out the plurality of kinds of articles detected by the detecting portion from the conveyor.

According to this configuration, time and a position of each of a plurality of kinds of articles being supplied onto the conveyor is controlled by the article controlling portion so that kinds of articles to be image-picked-up by the image pickup apparatus after that are limited in advance. Then, the plurality of kinds of articles are detected by the detecting portion from images picked-up by the image pickup apparatus on the basis of the kinds of articles limited by the article controlling portion. Then, the detected plurality of kinds of articles are taken out from the conveyor by the robot.

Thus, since the kinds of articles to be included in picked-up images are limited in advance, it becomes possible to shorten processing time at the time of detecting articles, and it is possible to efficiently detect the articles.

In the robot system according to the first aspect of the present invention described above, the robot may be configured to convey each of the plurality of kinds of articles taken out from the conveyor to a corresponding dispensing device among a plurality of dispensing devices prepared for the kinds of articles, respectively.

In the robot system according to the first aspect of the present invention described above, the article controlling portion may be configured to control the time and the position of each of the plurality of kinds of articles being supplied onto the conveyor so that mutually different kinds of articles among the plurality of kinds of articles are not mixed.

In the robot system according to the first aspect of the present invention described above, the number of the kinds of articles to be image-picked-up by the image pickup apparatus may be one.

A second aspect of the present invention is a production system including: a conveyor that conveys a plurality of kinds of articles; a plurality of production apparatuses that supply the plurality of kinds of articles to the conveyor; an image pickup apparatus that picks up images of the plurality of kinds of articles conveyed by the conveyor; an article controlling portion that controls time and a position of each of the plurality of kinds of articles being supplied onto the conveyor, to limit kinds of articles to be image-picked-up by the image pickup apparatus in advance; a detecting portion that detects the plurality of kinds of articles from the images picked up by the image pickup apparatus, on the basis of the kinds of articles limited in advance by the article controlling portion; and a robot that is configured to take out the plurality of kinds of articles detected by the detecting portion from the conveyor.

According to this configuration, at the time of articles being supplied from a plurality of production apparatuses to the conveyor, time and a position of each of the plurality of kinds of articles being supplied are controlled by the article controlling portion so that kinds of articles to be image-picked-up by the image pickup apparatus at a subsequent stage are limited in advance. Then, the plurality of kinds of articles are detected by the detecting portion from images picked-up by the image pickup apparatus on the basis of the kinds of articles limited by the article controlling portion. Then, the detected plurality of kinds of articles are taken out from the conveyor by the robot.

Thus, since the kinds of articles to be included in picked-up images are limited in advance, it becomes possible to shorten processing time at the time of detecting articles, and it is possible to efficiently detect the articles.

In the production system according to the second aspect of the present invention described above, a plurality of dispensing devices for the kinds of articles, respectively, may be provided; and the robot may be configured to convey each of the plurality of kinds of articles taken out from the conveyor to a corresponding dispensing device among a plurality of dispensing devices prepared for the kinds of articles, respectively.

In the production system according to the second aspect of the present invention described above, each of the plurality of production apparatuses may be an injection molding machine.

In the production system according to the second aspect of the present invention described above, the article controlling portion may be configured to control the time and the position of each of the plurality of kinds of articles being supplied onto the conveyor so that mutually different kinds of articles among the plurality of kinds of articles are not mixed.

In the production system according to the second aspect of the present invention described above, the number of the kinds of articles to be image-picked-up by the image pickup apparatus may be one.

According to the present invention, an advantage is obtained that it is possible to efficiently detect a plurality of kinds of articles that are conveyed.

The invention claimed is:

1. A robot system comprising:
   an image pickup apparatus that picks up images of a plurality of kinds of articles conveyed by a conveyor;
   an article controlling portion that controls time and a position of each of the plurality of kinds of articles being supplied onto the conveyor to limit kinds of articles to be image-picked-up by the image pickup apparatus in advance;
   a detecting portion that detects the plurality of kinds of articles from the images picked up by the image pickup apparatus of the kinds of articles limited in advance by the article controlling portion; and
   a robot that is configured to take out the kinds of articles detected by the detecting portion from the conveyor,
   wherein the article controlling portion is configured to transmit information about the limited kinds of articles to the detecting portion.

2. The robot system according to claim 1, wherein the robot conveys each of the plurality of kinds of articles taken out from the conveyor to a corresponding dispensing device among a plurality of dispensing devices prepared for the plurality of kinds of articles, respectively.

3. The robot system according to claim 1, wherein the article controlling portion controls the time and the position of each of the plurality of kinds of articles being supplied onto the conveyor so that mutually different kinds of articles among the plurality of kinds of articles are not mixed.

4. The robot system according to claim 1, wherein the number of the kinds of articles to be image-picked-up by the image pickup apparatus is one.

5. A production system comprising:
   a conveyor that conveys a plurality of kinds of articles;
   a plurality of production apparatuses that supply the plurality of kinds of articles to the conveyor;
   an image pickup apparatus that picks up images of the plurality of kinds of articles conveyed by the conveyor;
   an article controlling portion that controls time and a position of each of the plurality of kinds of articles being supplied onto the conveyor, to limit kinds of articles to be image-picked-up by the image pickup apparatus in advance;
   a detecting portion that detects the plurality of kinds of articles from the images picked up by the image pickup apparatus of the kinds of articles limited in advance by the article controlling portion; and
   a robot that is configured to take out the plurality of kinds of articles detected by the detecting portion from the conveyor,
   wherein the article controlling portion is configured to transmit information about the limited kinds of articles to the detecting portion.

6. The production system according to claim 5, further comprising a plurality of dispensing devices for the kinds of articles, respectively; wherein
   the robot conveys each of the plurality of kinds of articles taken out from the conveyor to a corresponding dispensing device among the plurality of dispensing devices prepared for the kinds of articles, respectively.

7. The production system according to claim 5, wherein each of the plurality of production apparatuses is an injection molding machine.

8. The production system according to claim 5, wherein the article controlling portion controls the time and the position of each of the plurality of kinds of articles being supplied onto the conveyor so that mutually different kinds of articles among the plurality of kinds of articles are not mixed.

9. The production system according to claim 5, wherein the number of the kinds of articles to be image-picked-up by the image pickup apparatus is one.

* * * * *